US007976643B2

(12) United States Patent
Sakuma et al.

(10) Patent No.: US 7,976,643 B2
(45) Date of Patent: Jul. 12, 2011

(54) PRODUCTION METHOD FOR NANOCOMPOSITE MAGNET

(75) Inventors: Noritsugu Sakuma, Susono (JP); Tetsuya Shoji, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 103 days.

(21) Appl. No.: 12/516,894

(22) PCT Filed: Nov. 27, 2007

(86) PCT No.: PCT/IB2007/004326
§ 371 (c)(1),
(2), (4) Date: May 29, 2009

(87) PCT Pub. No.: WO2008/065539
PCT Pub. Date: Jun. 5, 2008

(65) Prior Publication Data
US 2010/0061874 A1  Mar. 11, 2010

(30) Foreign Application Priority Data
Nov. 29, 2006  (JP) .................................. 2006-321721

(51) Int. Cl.
*H01F 1/032* (2006.01)
*H01F 1/057* (2006.01)

(52) U.S. Cl. .......... 148/105; 148/101; 148/104; 419/12; 419/35

(58) Field of Classification Search ........................ None
See application file for complete search history.

(56) References Cited

U.S. PATENT DOCUMENTS
2006/0008645 A1 * 1/2006 Kishimoto et al. ........... 428/403

FOREIGN PATENT DOCUMENTS
JP  2003 59708   2/2003
JP  2004 18932   1/2004
JP  2004 363474  12/2004

OTHER PUBLICATIONS
U.S. Appl. No. 12/513,245, filed May 1, 2009, Sakuma et al.

* cited by examiner

*Primary Examiner* — John P Sheehan
(74) *Attorney, Agent, or Firm* — Oblon, Spivak, McClelland, Maier & Neustadt, L.L.P.

(57) ABSTRACT

A nanocomposite magnet containing an Fe particle in the grain boundary of an $Nd_2Fe_{14}B$ compound particle is produced by mixing a dispersion of the $Nd_2Fe_{14}B$ compound particle in a solvent containing a surface-active agent and a dispersion of the Fe particle in a solvent containing a surface-active agent, and then supporting the Fe particle on the surface of the $Nd_2Fe_{14}B$ compound particle by stirring the mixture of the dispersions while adding an amphiphilic solvent, and then performing the drying and the drying and the sintering.

11 Claims, 4 Drawing Sheets

SAMPLE 1

SAMPLE 2

SAMPLE 3

SAMPLE 4

SAMPLE 1

SAMPLE 2

SAMPLE 3

SAMPLE 4

PRODUCTION METHOD FOR NANOCOMPOSITE MAGNET

FIELD OF THE INVENTION

The invention relates to a production method for a nanocomposite magnet for use as a permanent magnet in various motors and the like.

BACKGROUND OF THE INVENTION

Permanent magnets are used in a wide variety of fields, including electronics, information and communications, industrial and automotive electric motors, etc. With regard to the permanent magnets, further enhancement in performance and further reduction in size and weight are demanded. Presently, $Nd_2Fe_{14}B$ compounds (neodymium magnets) are widely used as high-permeance magnets, and various proposals have been made for the purpose of further enhancement in performance.

One approach for such performance enhancement is disclosed in Japanese Patent Application Publication No. 2003-59708 (JP-A-2003-59708). Japanese Patent Application Publication No. 2003-59708 (JP-A-2003-59708) describes a nanocomposite magnet in which a soft magnetic phase with high magnetization and a hard magnetic phase with high coercive force are uniformly distributed in the same metallic structure and the soft and hard magnetic phases are magnetically coupled due to an exchange interaction. This nanocomposite magnet is produced as follows. That is, a raw alloy melt is rapidly cooled to prepare a rapidly solidified alloy. Then, the rapidly solidified alloy is thermally treated to disperse Fe fine particles in the hard magnetic phase, thus producing a nanocomposite magnet. The patent application says that by controlling the condition of the thermal treatment, a minute Fe phase is dispersed in the nanocomposite magnet.

However, the foregoing method has the following problem. That is, depending on the thermal treatment condition, the crystal grain of Fe becomes rough and large, and the method is not suitable for an industrial technique that requires large-volume synthesis.

DISCLOSURE OF THE INVENTION

An object of the invention is to provide a method of producing a nanocomposite magnet that contains an Fe particle of an appropriate particle diameter.

A first aspect of the invention relates to a production method for a nanocomposite magnet that contains an Fe particle in a grain boundary of an $Nd_2Fe_{14}B$ compound particle. This production method includes: mixing a dispersion of the $Nd_2Fe_{14}B$ compound particle in a solvent containing a surface-active agent, and a dispersion of the Fe particle in a solvent containing a surface-active agent; then supporting the Fe particle on a surface of the $Nd_2Fe_{14}B$ compound particle by stirring the mixture of the dispersions while adding an amphiphilic solvent; and performing drying and sintering.

An amount of the Fe particle may be 0.04 to 0.05 mol/L in the number of moles of the Fe particle present in the mixture of the dispersion of the $Nd_2Fe_{14}B$ compound particle and the dispersion of the Fe particle.

A particle diameter of the $Nd_2Fe_{14}B$ compound particle may be 500 nm to 2 μm.

A particle diameter of the Fe particle may be 2 to 50 nm.

A mixing proportion between the $Nd_2Fe_{14}B$ compound particle and the Fe particle may be such as to be expressed as $VFe/VNd_2Fe_{14}B$=0.1 to 1.5 in volume ratio (where VFe is a volume of the Fe particle, and $VNd_2Fe_{14}B$ is the volume of the $Nd_2Fe_{14}B$ compound particle).

The solvent may be at least one of kerosene and hexane.

The surface-active agent may be at least one of oleylamine, oleic acid, and tetraethylene glycol.

An adding rate of the amphiphilic solvent may be less than or equal to 1 mL/min.

The sintering may be performed at 300 to 550° C.

The sintering may be performed under a hydrogen reduction atmosphere.

A technique of the sintering may be at least one of spark plasma sintering and hot press.

According to the first aspect of the invention, when a dispersion of $Nd_2Fe_{14}B$ compound particles and a dispersion of Fe particles are mixed and the mixture is stirred while an amphiphilic solvent is added, the aggregation of $Nd_2Fe_{14}B$ compound particles and the aggregation of Fe particles due to collision of the particles can be prevented since the particles are covered with the surface-active agent. Furthermore, the surface-active agent is gradually removed by the amphiphilic solvent gradually added. As a result, Fe particles of the order of nanometer are supported on the surfaces of $Nd_2Fe_{14}B$ compound particle of submicron order.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
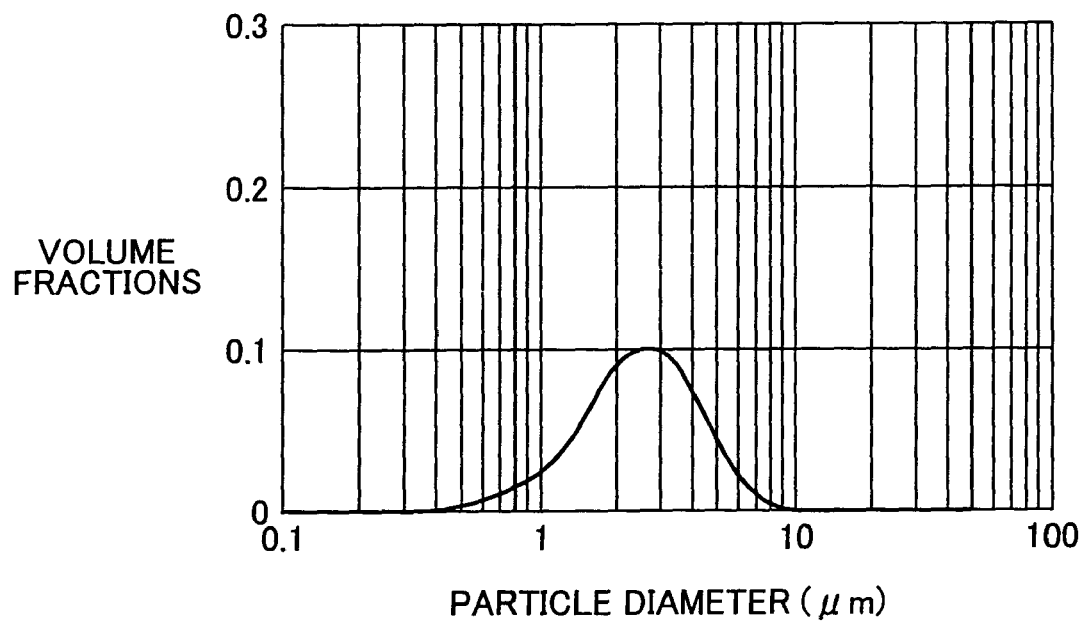
FIG. 1 is a graph showing a particle diameter distribution of $Nd_2Fe_{14}B$ particles used in a working example of the invention.

The production method for a nanocomposite magnet in accordance with the invention will be described in detail below. In the production method for a nanocomposite magnet in accordance with the invention, firstly, an $Nd_2Fe_{14}B$ compound particle is added and dispersed in a solvent that contains a surface-active agent. The $Nd_2Fe_{14}B$ compound particle can be obtained by pulverizing, through the use of a cutter mill, an $Nd_2Fe_{14}B$ amorphous ribbon produced in a single-roll furnace within a glove box. It is preferable that the particle diameter of the $Nd_2Fe_{14}B$ compound particle be in an order of submicron, that is, in the range of 500 nm to 2 μm, in order to achieve the effect of the conjugation with the Fe particle that constitutes the soft magnetic phase. The $Nd_2Fe_{14}B$ compound particle may be pulverized so as to have the aforementioned particle diameter before being added to the solvent, and may also be pulverized by a beads mill or the like after being added into a solvent.

It is preferable that the solvent be stable during the mixing and stirring operations that follow; for example, kerosene, hexane, etc., may be used.

As the surface-active agent, oleylamine, oleic acid, tetraethylene glycol, etc., may be used. Due to the addition of the surface-active agent, the $Nd_2Fe_{14}B$ compound particle can be maintained in a stably dispersed state in the solvent. Furthermore, the aggregation of $Nd_2Fe_{14}B$ compound particles caused by stirring can be prevented.

Separately from the dispersion of the $Nd_2Fe_{14}B$ compound particle in the solvent containing the surface-active agent, a dispersion of an Fe particle in a solvent containing a surface-active agent is prepared. It is preferable that the particle diameter of the Fe particle be in the order of nanometer, for example, in the range of 2 to 50 nm and particularly, 2 to 10 nm, in order to achieve the effect of the conjugation with the $Nd_2Fe_{14}B$ compound particle that constitutes the hard magnetic phase. The dispersion of the Fe particle can be prepared by pulverizing Fe particles and dispersing them in a surface-active agent-containing solvent. However, it is difficult to pulverize Fe particles to the order of nanometer. Therefore, it is preferable to prepare the Fe particle through the deposition from an Fe precursor caused by reduction, thermal decomposition, etc. of the Fe precursor. It suffices that the Fe precursor be a material that produces deposit of Fe particles due to reduction, thermal decomposition, etc. For example, iron acetylacetonate, pentacarbonyliron, a salt of Fe (e.g., $FeCl_3$, $FeSO_4$), etc. may be used as an Fe precursor.

For example, in the case where iron acetylacetonate is used as the Fe precursor, Fe particles can be deposited through reduction since iron acetylacetonate dissolves in an organic solvent and therefore the iron exists as ions. In this case, it is preferable to use a polyol as a reducing agent and perform polyol reduction. The polyols that can be used in this manner include 1,2-octanediol, 1,2-dodecanediol, 1,2-tetradecanediol, 1,2-hexadecanediol, etc.

In order to dissolve the Fe precursor and reduce the Fe precursor, it is preferable to heat the reaction system (solvent). In particular, in order to perform the reduction completely, it is preferable to heat the reaction system to or above 200° C. The heating time (reduction time) varies depending on the heating temperature, and is selected so as to allow the Fe precursor to be sufficiently reduced and cause Fe particles to deposit.

In the case where pentacarbonyliron ($Fe(CO)_5$) is used as the Fe precursor, Fe particles can be deposited by thermally decomposing pentacarbonyliron. It is preferable that the heating temperature for the thermal decomposition be higher than or equal to 150° C.

In the case where a salt of Fe is used as the Fe precursor, Fe particles are deposited by forming reversed micelles of the salt of Fe and dispersing them in the solvent since the salt of Fe does not dissolve in organic solvents. Generally, while a micelle means a system in which an oil droplet is enclosed in a water phase due to the action of a surface-active agent, a reversed micelle means a system in which a water droplet is enclosed in an oil phase due to the employment of a surface-active agent, specifically, a system in which the salt of Fe is enclosed in the solvent by means of the surface-active agent. The surface-active agent that may be used herein include polyoxyethylenelauryl ether, polyoxyethyleneoctylphenyl ether, AOT (sodium bis(2-ethylhexyl)sulfosuccinate), etc. which are commonly used to form reversed micelles.

By depositing Fe particles in the solvent as described, the dispersion of Fe particles can be prepared. The dispersion of $Nd_2Fe_{14}B$ compound particles and the dispersion of Fe particles obtained as described above are mixed. It is preferable herein that the $Nd_2Fe_{14}B$ compound particle dispersion and the Fe particle dispersion be mixed so that the number of moles of the Fe particles present in the mixture is 0.04 to 0.05 mol/L. If the concentration of Fe in the mixture is lower than 0.04 mol/L, a sufficient amount of Fe cannot be supported. Furthermore, since the amount of the surface-active agent adhering thereto is small, the film of the surface-active agent easily breaks when the amphiphilic solvent is added. As a result, Fe particles aggregate and become rough and large. If the concentration Fe in the mixture is higher than 0.05 mol/L, the amount of Fe particles supported becomes large so that the intervals between the $Nd_2Fe_{14}B$ compound particles, which form the hard magnetic phase, becomes excessively large, resulting in an insufficient characteristic of a nanocomposite magnet. Therefore, although the Fe concentration outside the aforementioned numerical value range could provide characteristics of a nanocomposite magnet, it is desirable that the Fe concentration be within the aforementioned numerical value range in order to obtain sufficient characteristics of a nanocomposite magnet.

After the dispersion of $Nd_2Fe_{14}B$ compound particles and the dispersion of Fe particles are mixed, the mixture is vigorously stirred while an amphiphilic solvent is gradually added thereto. The amphiphilic solvent is a solvent capable of dissolving and thereby removing the surface-active agents present on the surfaces of the $Nd_2Fe_{14}B$ compound particles and the surfaces of the Fe particles. For example, acetone, THF (tetrahydrofuran), ethyl alcohol, etc. may be used as the amphiphilic solvent. If the amphiphilic solvent is not added, the $Nd_2Fe_{14}B$ compound particles and the Fe particles do not couple to aggregate despite stirring since the $Nd_2Fe_{14}B$ compound particles and the Fe particles are protected by the surface-active agents. However, the gradual addition of the amphiphilic solvent gradually removes the surface-active agents present on the surfaces of the $Nd_2Fe_{14}B$ compound particles and the surfaces of the Fe particles. As a result, the Fe particles that have become free of the surface-active agent become coupled and supported on the surfaces of the $Nd_2Fe_{14}B$ compound particle that have also become free of the surface-active agent. If the amphiphilic solvent is added all at once, the surface-active agents present on the surfaces of the $Nd_2Fe_{14}B$ compound particles and the surfaces of the Fe particles are quickly removed, so that the particles aggregate, and particularly, Fe particles aggregate and the particle diameter of Fe particles becomes large. Thus, adding the amphiphilic solvent all at once is not preferable. The rate of addition of the amphiphilic solvent varies depending on the kind of the surface-active agent, the concentration thereof, etc. However, in general, it is preferable that the rate of addition be equal to or less than 1 mL/min.

The $Nd_2Fe_{14}B$ compound particles supporting on the surfaces the Fe particles in this manner are dried and sintered, thus providing a nanocomposite magnet. It is preferable that the sintering be performed at a temperature (300 to 550° C.) which is immediately above the temperature that accelerates the self-diffusion of Fe and which is as low as possible in order to restrain the growth of the Fe particles. As for the sintering technique, it is preferable to perform SPS (Spark Plasma Sintering), hot press, etc., under a hydrogen reduction atmosphere.

An $Nd_2Fe_{14}B$ amorphous ribbon prepared through the use of a single-roll furnace in a glove box was pulverized through the use of a cutter mill. The $Nd_2Fe_{14}B$ pulverized by the cutter mill was added to a system formed by adding oleic acid and oleylamine into octyl ether, and was pulverized for 6 hours in a beads mill using beads of $\phi500$ μm. 0.3 g of the thus obtained particles of $Nd_2Fe_{14}B$, together with the 10 mL of oleic acid and 10 mL of oleylamine, was added to 30 mL of kerosene, and the $Nd_2Fe_{14}B$ particles were dispersed by ultrasonic wave. FIG. 1 shows a particle size distribution of the $Nd_2Fe_{14}B$ particles in the dispersion measured by a light scattering method.

Figure 2:
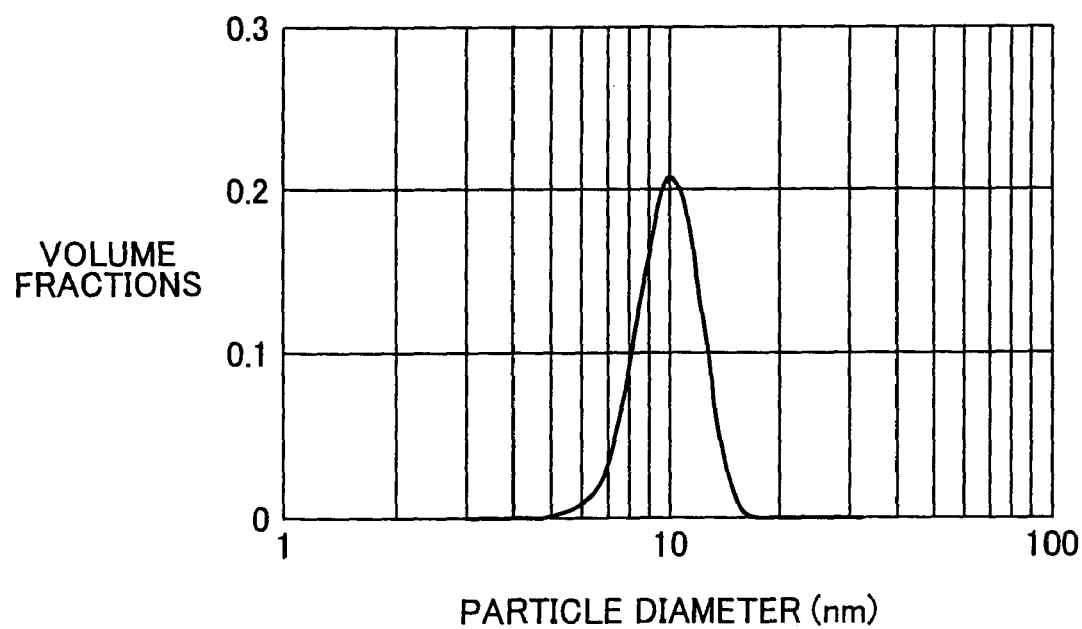
FIG. 2 is a graph showing a particle diameter distribution of Fe particles used in the working example.

Next, 5 mmol of iron acetylacetonate was dissolved in 8 mL of oleic acid and 8.5 mL of oleylamine at 160° C. After the temperature was raised to 230° C., 7.5 mmol of a reducing agent (hexadecane diol) was added, and reaction was allowed to progress for 1 hour. After that, hexane was added to make the total volume equal to 50 mL. The thus prepared dispersion of Fe particles (0.28 g of Fe particles in 50 mL) was added at proportions shown in Table 1 below. Specifically, the amounts of Fe particles in the mixtures were varied by adding varied amounts of the dispersion containing Fe particles at a rate of 0.28 g in 50 mL into 50 mL of the dispersion containing $Nd_2Fe_{14}B$ particles at a rate of 0.3 g in 50 mL. For example, in the case where the amount of the Fe dispersion added was 35.7 mL, the amount of Fe particles added was (35.7/50)× 0.28=0.2 g. The amounts of the two particles in volume ratio and the molar concentrations of the Fe particle in the mixtures are also presented in Table 1. FIG. 2 shows a particle size distribution of Fe particles in the Fe dispersion measured by SAXAS.

TABLE 1

|  | $Nd_2Fe_{14}B$ particle | Amount of 0.28 g/50 ml Fe dispersion | Fe particle | Volume ratio of Fe particle/ $Nd_2Fe_{14}B$ particle | Concentration of Fe particle in mixture (mol/l) |
| --- | --- | --- | --- | --- | --- |
| Sample 1 | 0.3 g | 50 ml | 0.28 g | 1 | 0.050 |
| Sample 2 | 0.3 g | 35.7 ml | 0.2 g | 0.67 | 0.042 |
| Sample 3 | 0.3 g | 14.8 ml | 0.083 g | 0.27 | 0.023 |
| Sample 4 | 0.3 g | 8.9 ml | 0.05 g | 0.17 | 0.015 |

150 mL of acetone was added to the mixtures at a rate of 1 mL/min. After particles sedimented, the supernatant was removed. Then, the particles were washed by repeating the addition of acetone and the sedimentation several times.

Figure 3:
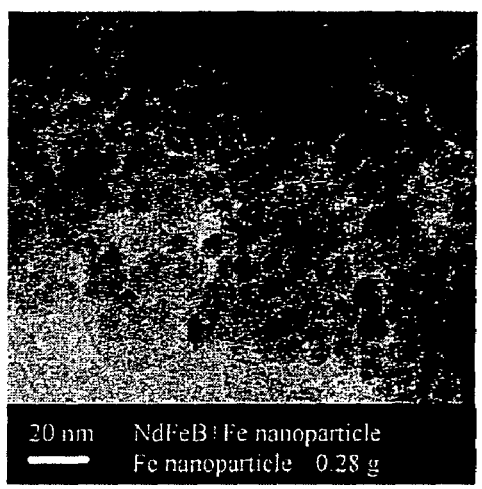
FIG. 3 shows TEM photographs of $Nd_2Fe_{14}B$/Fe composite particles obtained in the working example.
Figure 3:
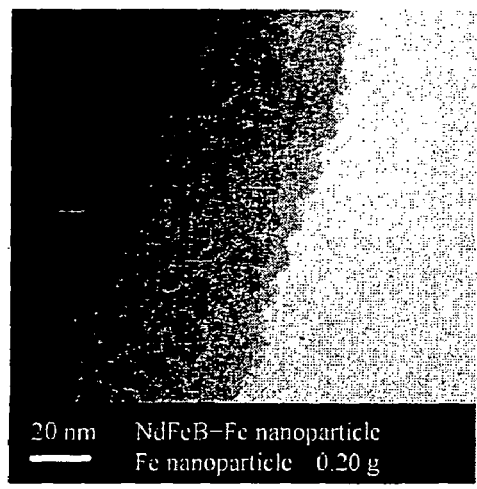
Figure 3:
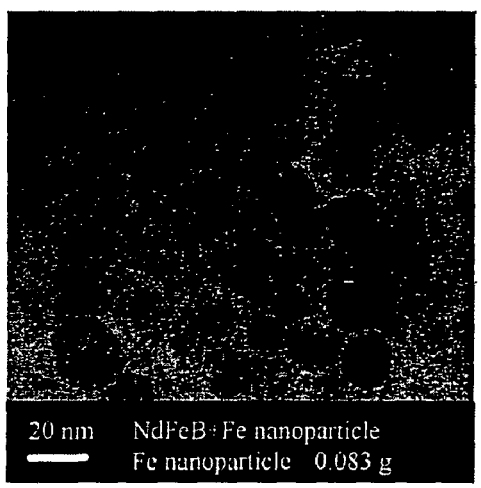
Figure 3:
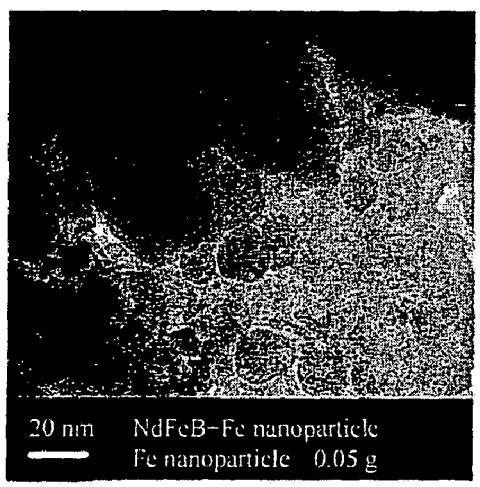
Figure 4:
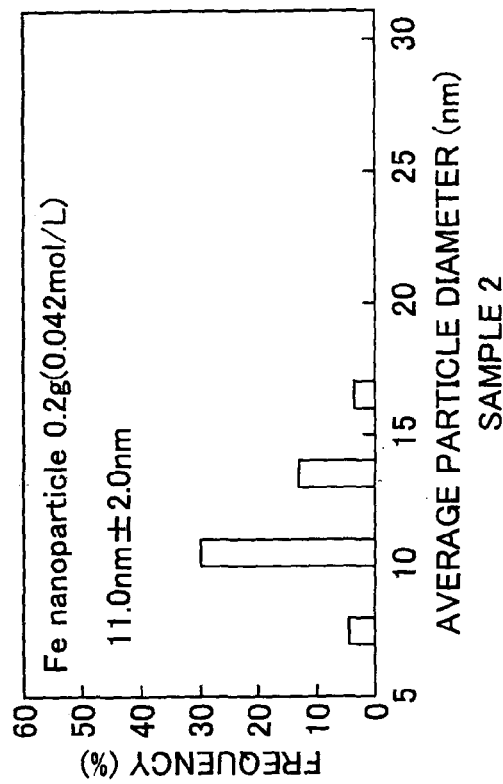
FIG. 4 is a graph showing a particle diameter distribution of Fe particles in the $Nd_2Fe_{14}B$/Fe composite particles obtained in a working example.
Figure 4:
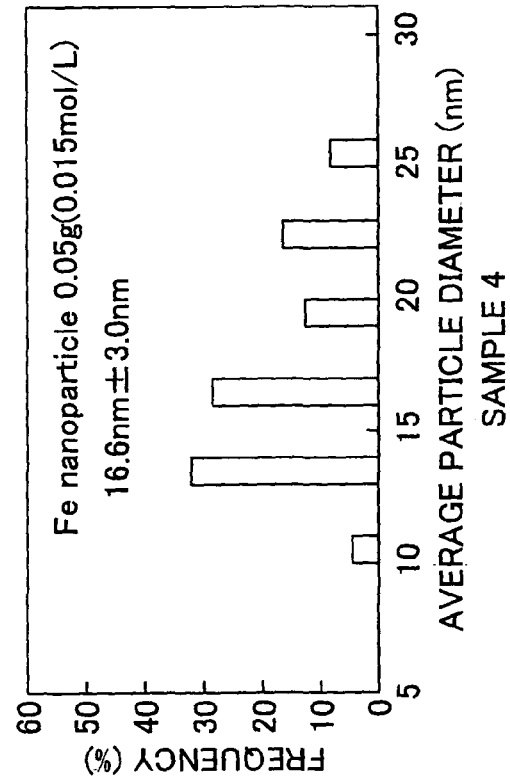
Figure 4:
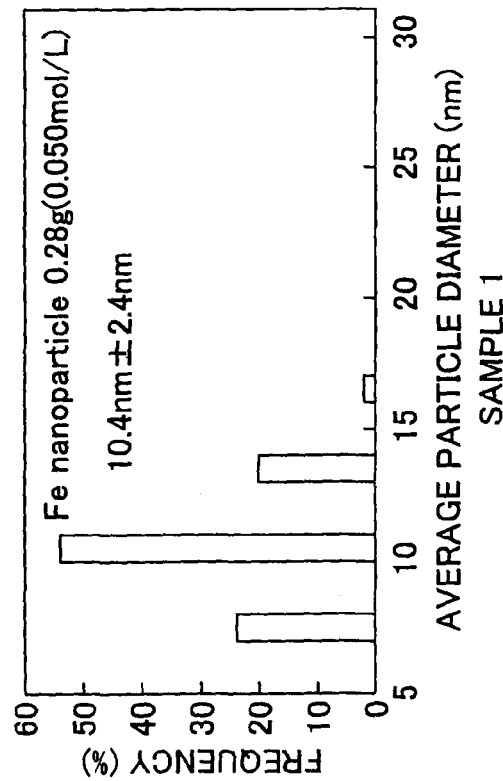
Figure 4:
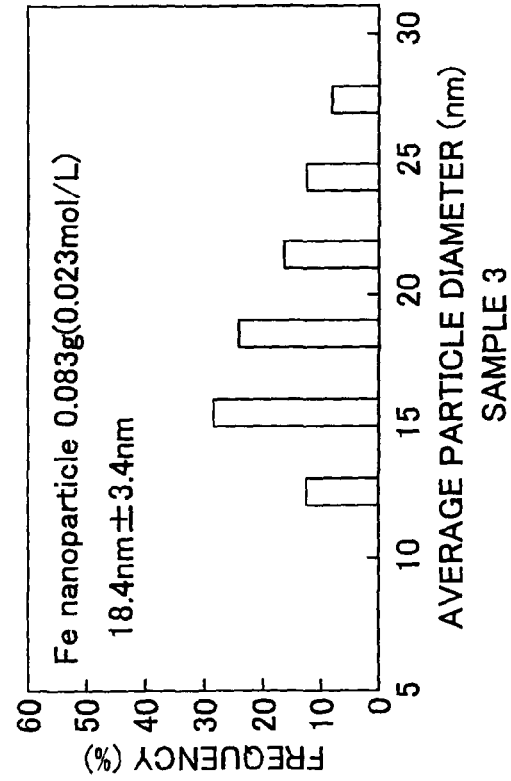
Figure 5:
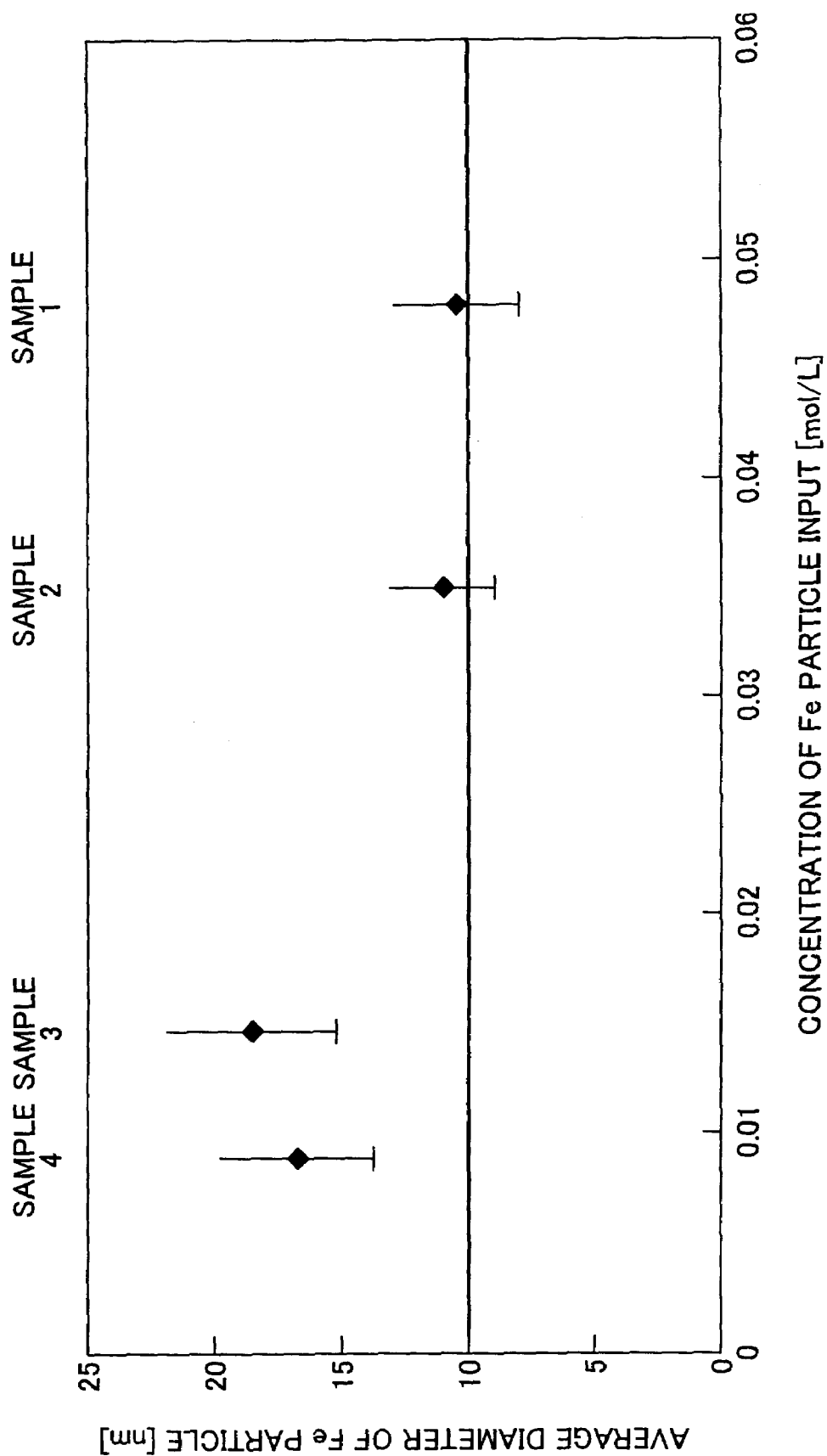
FIG. 5 is a graph showing a relationship between the amount of Fe particles input and the average particle diameter of Fe particles.

Results of the TEM observation of obtained samples are shown in FIG. 3. Besides, from the TEM images, the particle diameters of the generated Fe particles were measured. Results of the measurement are shown in FIG. 4. Changes in the particle diameter of the generated Fe particles in relation to changes in the amount of Fe particles input are shown in FIG. 5. In any of the samples, the generation of spherical Fe nanoparticles of about 10 to 20 nm on $Nd_2Fe_{14}B$ particles of submicron order was recognized.

While the invention has been described with reference to example embodiments thereof, it is to be understood that the invention is not limited to the described embodiments or constructions. On the other hand, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A production method for a nanocomposite magnet that contains an Fe particle in a grain boundary of an $Nd_2Fe_{14}B$ compound particle, comprising:
   mixing a dispersion of $Nd_2Fe_{14}B$ compound particles in a solvent containing a surface-active agent, and a dispersion of Fe particles in a solvent containing a surface-active agent;
   then supporting the Fe particles on a surface of the $Nd_2Fe_{14}B$ compound particles by stirring the mixture of the dispersions while adding an amphiphilic solvent; and
   drying and sintering the $Nd_2Fe_{14}B$ compound particles supporting the Fe particles to provide the nanocomposite magnet.

2. The production method according to claim 1, wherein an amount of the Fe particles is 0.04 to 0.05 mol/L in the number of moles of the Fe particles present in the mixture of the dispersion of the $Nd_2Fe_{14}B$ compound particles and the dispersion of the Fe particles.

3. The production method according to claim 1, wherein a particle diameter of the $Nd_2Fe_{14}B$ compound particles is 500 nm to 2 μm.

4. The production method according to claim 1, wherein a particle diameter of the Fe particles is 2 to 50 nm.

5. The production method according to claim 1, wherein a mixing proportion between the $Nd_2Fe_{14}B$ compound particles and the Fe particles is such as to be expressed as VFe/$VNd_2Fe_{14}B$=0.1 to 1.5 in volume ratio, where VFe is a volume of the Fe particles, and $VNd_2Fe_{14}B$ is the volume of the $Nd_2Fe_{14}B$ compound particles.

6. The production method according to claim 1, wherein the solvent is at least one of kerosene and hexane.

7. The production method according to claim 1, wherein the surface-active agent is at least one of oleylamine, oleic acid, and tetraethylene glycol.

8. The production method according to claim 1, wherein an adding rate of the amphiphilic solvent is less than or equal to 1 mL/min.

9. The production method according to claim 1, wherein the sintering is performed at 300 to 550° C.

10. The production method according to claim 1, wherein the sintering is performed under a hydrogen reduction atmosphere.

11. The production method according to claim 10, wherein a technique of the sintering is at least one of spark plasma sintering and hot press.

* * * * *